Jan. 20, 1948.  G. CHAUSSON  2,434,735
GEAR-BOX CONTROL DEVICE
Filed Dec. 3, 1945

INVENTOR
Gaston Chausson
BY
Richard y Geier
ATTORNEYS

Patented Jan. 20, 1948

2,434,735

UNITED STATES PATENT OFFICE 2,434,735

GEARBOX CONTROL DEVICE

Gaston Chausson, Asnieres, France, assignor to Société Anonyme des Usines Chausson, Asnieres, France, a company of France Application December 3, 1945, Serial No. 632,487
In France October 18, 1944

4 Claims. (Cl. 74—473)

The object of the present invention is a gearbox control device permitting reliable and easy operation, while presenting a construction of great simplicity.

Conformably to the invention, the hubs of two driving arms of the sliding gears slide along a spindle and are each solid with a small plate bearing a notch, said small plates are placed each on one side of said spindle, then the operating lever is terminated by a fork the two prongs of which are spaced from one another by the diameter of said spindle plus the thickness of said small plates, so that one of said branches may be completely disengaged when the other is entirely introduced, by a movement transverse to said spindle, in the notch of one of the small plates, a bolt of a length corresponding to the interval provided between the branches of the fork sliding in a bore transverse to said spindle at right angles with the branches of the fork when the operating lever is in neutral.

The spindle on which the hubs of the two driving arms of the sliding gears slide can be overhangingly mounted on a wall of the gear-box, for instance on its cover, which facilitates mounting.

Moreover, the small plates are of a suitable length so that the one which moves remains in contact with the end of the bolt during the whole amplitude of its movement, in order to maintain said bolt engaged in the notch of the other small plate which is thus immobilized in neutral, the fixed small plate serving on the other hand as a guide for the free branch of the fork which does not effect the operation.

Further features and advantages of the invention will be gathered from the following specification and from the drawings, in which the invention is illustrated by way of example:

Figure 4:
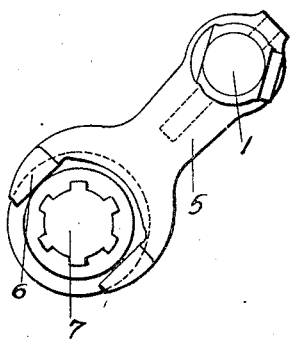
Figure 4 is a side elevation of one of the driving arms of the sliding gears.

A spindle 1 is mounted in overhang on a wall of the gear-box and the two hubs 2, 3 of arms 4, 5 can slide along said spindle. Each of said arms is terminated, as shown in Figure 4, by a driving fork 6 of a sliding gear 7. Arm 5 actuates for instance the first speed and reverse sliding gear, while arm 4 actuates the second and third speed sliding gear.

A small plate 8 is fixed to hub 2 on the side of spindle 1 to which it is tangent and a small plate 9 is fixed to hub 3 on the other side of said spindle. The small plate 8 presents a notch 10 and the small plate 9 a notch 11. The two notches 10 and 11 of the small plates 8 and 9 are placed opposite each other, facing a bore 12 passing through spindle 1 transversely when the control lever 13 is in neutral. A bolt 14 is placed in such a manner as to be able to slide in bore 12. Said sliding bolt is of a length corresponding to the length of said bore, plus the thickness of one of the small plates 8 or 9.

The lever 13 comprises an articulation swiveljoint permitting it to be given orthogonal movements and, at its controlling end, a fork with two branches 16, 17, the interval between said two branches being substantially of the same length as the sliding bolt 14.

Figure 1:
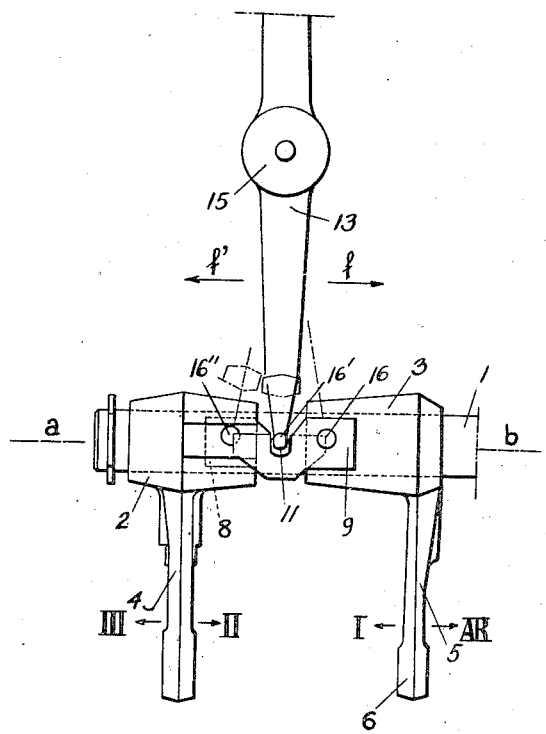
Figure 1 is a side elevation of the device.
Figure 3:
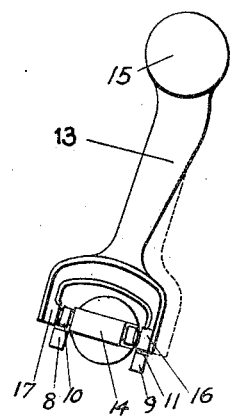
Figure 3 is a side elevation, partly in section, of the control lever.
Figure 2:
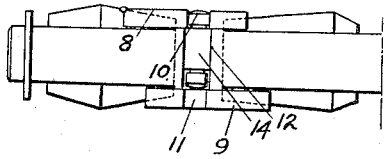
Figure 2 is a horizontal section substantially according to line a—b of Figure 1.

The device functions in the following manner:

In neutral, the lever 13 occupies the position represented in Figure 1, in which the notches 10 and 11 of the two small plates 8 and 9 are facing the bore 12 containing the bolt 14, which half engages in the notches 10 and 11 by its two ends thus immobilizing the two hubs 2, 3, with their arms 4, 5 and the sliding gears carried by them. The two ends 16, 17 of the fork terminating lever 13 are placed on either side of bolt 14, so that by giving a transverse movement in one direction or the other to lever 13, it is possible to make said bolt slide and bring branch 16 of the fork entirely into notch 11 of the small plate 9, as represented in Figure 3, or, on the contrary, branch 17 into notch 10 of small plate 8. In the latter case, branch 16 becomes disengaged from notch 11, as indicated in dotted lines in Figure 3.

To pass into reverse, branch 16 is brought into notch 11 of small plate 9 by giving a transverse movement to lever 13; the bolt 14 is thus pushed and engages in notch 10 of small plate 8 which becomes immobilized. The lever 13 then receives a longitudinal movement in the direction of arrow f in Figure 1, so that it pushes the small plate 9 and the hub 3 which is solid with it, as well as the arm 5 and fork 6 carrying the reverse sliding gear towards the corresponding transmission. The end of branch 16 then occupies the position 16'.

To pass into first speed, the lever 13 is pivoted in the direction of the arrow f', so that it pushes the sliding gear carried by fork 6 towards the corresponding transmission. The end of the branch 16 then comes and occupies the position 16".

To pass into second speed, after having returned the lever 13 to neutral, a transverse movement is given to said lever to bring branch 17 of its fork into notch 10 of the small plate 8, the bolt 14 engaging in notch 11 of the small plate 9 which it immobilizes. The lever 13 is then made to pivot according to arrow *f*, displacing the arm 4 and the sliding gear carried by said arm towards the second speed transmission.

To pass into third speed, it is sufficient to impart a longitudinal movement to lever 13 in the direction of arrow *f'* to bring the sliding gear carried by arm 4 into engagement with the corresponding transmission.

The small plates 8 and 9 are made of a length such that the end of bolt 14 which is not engaged in one of the notches 10 or 11 may be in contact with the inner face of small plate 9 or 8 throughout the displacement of the latter, so that the other end, of said bolt which is engaged in notch 10 or 11 cannot come out of said notch. Thus, one of the hubs 2 or 3 solid with arms 4, 5 carrying the two sliding gears is imperatively immobilized during the operations of the other hub of sliding gear arm. The lever 13 can therefore, under any circumstances, only actuate one of the sliding gears, which provides absolute safety, for one of the sliding gears is inevitably immobilized in neutral during the operation of the other.

In addition, the branch 16 or 17 of the fork which is disengaged from notch 10 or 11 is guided along the whole of its longitudinal movement by the outer face of small plate 8 or 9.

This device is moreover of great simplicity and only presents very small bulkiness in the box.

In the example represented, the small plates 8 and 9 are welded to the respective hubs 2 and 3. They might also be forged in one piece on these parts or be fixed to the latter by any other means.

It is evident that knuckle 15 is properly pinned, in a known manner, so as to permit none but orthogonal movements of lever 13.

Various modifications may moreover be made in the construction represented without exceeding the scope of the invention.

I claim:

1. A gear-box control device, comprising in combination a spindle, sliding gears, two arms controlling the sliding gears, said arms having hubs sliding on said spindle, a fork provided on said arms for driving the sliding gears, a small plate fixed on the side of each hub, a notch in said small plate, a bore passing through said spindle transversely, a sliding bolt in said bore having a length corresponding to the length of said bore plus the thickness of one of the small plates, a control lever having an articulation swivel-joint permitting it to be given orthogonal movements and an end fork with two branches with an interval between the latter having substantially the same length as the sliding bolt, the notches of both small plates and the bore of the spindle being alined when the control lever is in neutral.

2. A gear-box control device, comprising in combination a spindle, two arms driving each a sliding gear controlling two speeds, said arms having hubs sliding on said spindle, a fork provided on said arms for driving said sliding gears, a small plate fixed on the side of each hub on either side of said spindle to which both plates are tangent, a notch in each of said small plates, a bore passing through said spindle transversely, a sliding bolt in said bore having a length corresponding to the length of said bore plus the thickness of one of the small plates, a control lever having an articulation swivel-joint permitting it to be given orthogonal movements and an end fork with two branches with an interval between the latter having substantially the same length as the sliding bolt, the notches of both small plates and the bore of the spindle being alined when the control lever is in neutral.

3. A gear-box control device according to claim 2, comprising small plates which are of a suitable length so that the one which moves remains in contact with the end of the bolt throughout the amplitude of its movement, so as to maintain said bolt engaged in the notch of the other small plate which is thus immobilized in neutral, the fixed small plate serving on the other hand as a guide for the free branch of the fork which is not effecting the operation.

4. A gear-box control device according to claim 2, comprising a spindle, on which slide the hubs of the two driving arms of the sliding gears, which is overhangingly mounted in the gear-box.

GASTON CHAUSSON.

REFERENCES CITED

The following references are of record in the file of this patent:

UNITED STATES PATENTS

| Number | Name | Date |
| --- | --- | --- |
| 2,168,592 | Vanderveld | Aug. 8, 1939 |

FOREIGN PATENTS

| Number | Country | Date |
| --- | --- | --- |
| 88,830 | Austria | June 26, 1922 |